Patented Nov. 8, 1932

1,886,612

UNITED STATES PATENT OFFICE

FRED W. WAGNER AND FORREST L. McINTIRE, OF PITTSBURGH, PENNSYLVANIA

PROCESS OF MAKING MOTOR FUEL FROM LIGHT OIL

No Drawing.  Application filed March 5, 1930. Serial No. 433,497.

This invention relates generally to the production of motor fuel from coal, and more particularly to a method of making motor fuel from crude light oil.

In the destructive distillation of coal, the coal is heated without access of air and the gases containing water, ammonia, tar, and light oil collected. The water and tar are removed from the gas stream, initially, by condensation. The ammonia is removed from the gas stream by direct contact with sulphuric acid and the light oil is removed from the gas stream by conducting the gas stream through scrubbing towers in which the latter is brought into intimate contact with a stream of scrubbing oil flowing counter-current to the gas. The scrubbing oil is generally a high boiling petroleum fraction known as "straw oil". After the straw oil has become saturated with light oil absorbed from the gas stream it is passed into a still and steam is blown through the straw oil in order to distill the aromatic hydrocarbons. This distillate forms the crude light oil which we treat to form motor fuel.

This light oil comprises a mixture of hydrocarbons including benzol, taluol, xylols, olefines, diolefines, napthalene, thiophenes, mercaptans, carbon bisulfide, para-cumerone, and, perhaps, other hydrocarbons. The last named constituents beginning with the diolefines are impurities which it is desired to eliminate from the motor fuel. The olefines should be present in the motor fuel since they impart anti-knock properties thereto.

Up to the present time, it has been customary to wash the crude light oil with from 3 to 5% of 66° Bé sulphuric acid in order to throw down the impurities in the form of sludge. Certain of these impurities, such as the diolefines, if subjected to the temperatures now commonly employed in distilling the light oil, would be decomposed into gums which discolor the motor fuel so that it is not a clear water white as required by the trade. Certain other impurities, such as mercaptans, thiophene and its homologues and sulphonated hydrocarbons such as are formed with the treatment of 66° Bé sulphuric acid are objectionable due to their sulphur content and corrosive action. The removal of mercaptans and thiophene by the use of from 3 to 5% sulphuric acid, as is now the common practice, not only removes the impurities but also carries away practically all of the desirable olefines which should remain in the motor fuel. It has, however, been necessary up to the present time to remove practically all of the olefines in order to eliminate the diolefines and other impurities. By employing 3 to 5% sulphuric acid, heat is generated and a sulphonation of valuable constituents take place. These sulphonated products, if subjected to the temperatures now commonly employed in distilling the light oil, would decompose into corrosive sulphur-containing compounds which are very objectionable to the motor fuel as required by the trade.

In accordance with our invention, the crude light oil is washed with a much smaller percentage of sulphuric acid than has previously been the practice. The sulphuric acid initiates the polymerization of the gum-forming constituents but does not remove any substantial quantity of the olefines. The sludge is withdrawn and the oil rendered alkaline and thereafter subjected to fractional distillation. During the distillation, the temperature of the oil is maintained below the decomposition temperature of the gum-forming constituents and the distillation is carried out by applying a vacuum to the still in order to reduce the pressure therein. The employment of reduced pressure in the still enables the distillation to be carried out at temperatures below the decomposition points of the gum-forming constituents. The relatively low temperatures employed in the distillation cause the gum-forming constituents to polymerize, thereby raising their decomposition temperatures. After the gum-forming constituents and sulphur-containing hydrocarbons have been polymerized, the distilling temperature may be raised so as to distill the remainder of the hydrocarbons desired in the motor fuel without danger of decomposing the gum-forming constituents.

In a specific embodiment of the process, 8,000 gallons of crude light oil are charged into an agitator and intimately mixed with 155 pounds of 66° Bé sulphuric acid and the agitation continued for about ten minutes. After settling, the sludge is withdrawn at the bottom of the agitator. The product is again intimately mixed with 310 pounds of 66° Bé sulphuric acid and the mixing continued for about twenty minutes. The product is allowed to settle for about thirty minutes and the sludge withdrawn. The product is then carefully neutralized with 500 gallons of milk of lime (40 grams per litre) while the agitator is in slow motion, thereby preventing emulsification. After settling for sixty minutes, the milk of lime solution is withdrawn and the product is treated with 30 gallons of caustic soda solution (140 grams per litre) and the product, which is now known as "washed products" is transferred to storage tanks or stills.

The total quantity of acid employed in this example is 465 pounds or 30 gallons (15.5 pounds per gallon). The acid, therefore, constitutes slightly less than 0.4% by volume, and the caustic soda solution likewise constitutes slightly less than 0.4% by volume.

The washed product is charged into a fractionating still and distillation effected by employing indirect low pressure steam having a temperature not over 275° F., preferably not over 250°. The rate of distillation should not be more than 300 gallons per hour, and the quantity of water carried on the dephlegmator is controlled by the end point of the distilled product, as shown by laboratory test. This end point should not be over 100° C. The quantity of water used on the dephlegmator is regulated so that the pressure of the dephlegmator on the still column and still is kept below one pound. The greater the quantity of water used on the dephlegmator, the greater the amount of distillate which is condensed and is returned to the still column. If too large an amount of the distillate is condensed, it increases the pressure on the still which also increases the temperature in the still, and if this temperature becomes too great, there is danger of decomposing the gum-forming constituents. Accordingly, the pressure of the dephlegmator on the still column is maintained below about one pound.

The distillation is continued, maintaining the steam temperature below 275° F., preferably below 250° F., until the rate of distillation becomes less than desired. When the rate of distillation decreases below the desired amount, the steam pressure is reduced to zero and the pressure in the still is reduced by slowly applying vacuum at the receiver for receiving the distillate. The pressure in the still is progressively reduced until a vacuum equivalent to approximately 24 inches of mercury is reached. The use of reduced pressure in the still enables the distillation to be carried out at temperatures below those normally used and below temperatures which would cause the gum-forming constituents to decompose. The steam pressure is then slowly increased to give the desired rate of distillation, but the temperature of the steam is still maintained below 275° F. and preferably below 250° F. The distillation is continued until the rate of distillation decreases to approximately 150 gallons per hour. At this point, the still is shut down and the remainder of the charge is transferred to another fractionating still. This product is reserved until a full still charge of like material is accumulated.

The still, charged with these tailings, is started up using low pressure steam having a temperature not over 275° F., preferably not over 250° F. and vacuum equivalent to 24 inches of mercury is applied to the still. The distillation is continued in this manner until the distilled product shows an end point of approximately 140° C. When this point in the process has been reached, the gum-forming constituents and the sulphur-containing hydrocarbons have been polymerized by the relatively low temperatures employed thus far in the process. The polymerization of these gum-forming constituents has raised their boiling points so that they can now be subjected to higher temperatures without danger of decomposition. High-pressure super-heated steam having a temperature of approximately 500° F. is now introduced slowly while the vacuum in the still is maintained. The distillation using super-heated steam is continued at a rate not greater than 200 gallons per hour until the product produced shows an end point of not greater than 180° C. The quantity of water used on the dephlegmator is varied by the operator in accordance with the rate of distillation and the end point of the product.

The condensed distillate may be used alone as motor fuel or it may be mixed with about 25% of a high fraction straight petroleum distillate. Due to the polymerization of the gum-forming constituents by distilling at low temperatures, and under reduced pressure, the gum-forming constituents are prevented from being distilled over with the hydrocarbons, such as benzol, toluol, xylols, and the olefines, which it is desired to have present in the finished motor fuel. The relatively low amount of acid used in washing the crude light oil throws down less sludge than would be formed where large quantities of acid are employed in accordance with prior practice. The process above described results in an increase yield of approximately 12% over hitherto known processes.

The composition of light oils is variable, and the treatment of light oils, accordingly will vary somewhat in accordance with the makeup of the oils. In some cases, higher temperatures than those described in the specific embodiment of our invention could be used in the distilling operation without danger of decomposing the gum-forming constituents. The rates of distillation and the end points of the distilled products can be varied somewhat according to the fuel which it is desired to produce. In any case, however, the distillation is carried out in its early stages at a temperature which is sufficiently low as to insure polymerization of the gum-forming constituents and the distillation temperature is maintained below the decomposition temperature of these constituents.

We have described in detail the present preferred method of carrying out our process, but it will be understood that the invention may be otherwise practiced within the scope of the following claims.

We claim:

1. The process of making motor fuel from crude light oil obtained from coal, comprising washing it with the equivalent of about .4% by volume of 66° Bé sulphuric acid, removing the sludge, neutralizing the oil, treating it with the equivalent of about .4% by volume of caustic soda solution containing 140 grams per litre, and distilling it under partial vacuum while maintaining its temperature below the decomposition temperature of gum-forming constituents and sulphur-containing hydrocarbons.

2. In the process of making motor fuel from light oil obtained from coal, the steps comprising washing the oil with mineral acid in amount sufficient to initiate polymerization of gum-forming constituents but insufficient to remove a substantial amount of the olefines, removing the sludge, rendering the oil alkaline, distilling the oil under partial vacuum while maintaining its temperature below the decomposition temperature of gum-forming constituents and sulphur-containing hydrocarbons in order to polymerize said constituents and raise their decomposition points, and thereafter continuing the distillation at higher temperatures but below the decomposition point of the polymerized constituents.

3. In the process of making motor fuel from light oil obtained from coal and containing gum-forming constituents and sulphur-containing hydrocarbons, the steps comprising washing the oil with mineral acid in amount sufficient to initiate polymerization of gum-forming constituents but insufficient to remove a substantial amount of the olefines, removing the sludge, rendering the oil alkaline, distilling the oil under partial vacuum and at relatively low temperatures to polymerize said constituents and sulphur-containing hydrocarbons, and thereafter continuing the distillation at higher temperatures but below the decomposition points of the polymerized constituents.

4. In the process of making motor fuel from light oil obtained from coal and containing gum-forming constituents and sulphur-containing hydrocarbons, the steps comprising distilling a charge of oil under partial vacuum by the action of indirect steam having a temperature below 275° F., combining the remainder of the charge with a charge similar to said remaining charge, distilling the combined charges by the action of indirect steam at a temperature below 275° F. until the distilled product shows an end point not over 140° C., and thereafter continuing the distillation by the action of indirect steam at a temperature higher than 275° F. until the distilled product shows an end point not over 180° C.

In testimony whereof we have hereunto set our hands.

FRED W. WAGNER.
FORREST L. McINTIRE.